(12) United States Patent
Araki

(10) Patent No.: US 11,875,120 B2
(45) Date of Patent: Jan. 16, 2024

(54) AUGMENTING TEXTUAL DATA FOR SENTENCE CLASSIFICATION USING WEAKLY-SUPERVISED MULTI-REWARD REINFORCEMENT LEARNING

(71) Applicant: Robert Bosch GmbH, Stuttgart (DE)

(72) Inventor: Jun Araki, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 284 days.

(21) Appl. No.: 17/181,288

(22) Filed: Feb. 22, 2021

(65) Prior Publication Data
US 2022/0269863 A1 Aug. 25, 2022

(51) Int. Cl.
*G06F 40/30* (2020.01)
*G06F 40/284* (2020.01)
*G06N 3/08* (2023.01)
*G06F 40/166* (2020.01)
*G06N 3/045* (2023.01)

(52) U.S. Cl.
CPC ............ *G06F 40/30* (2020.01); *G06F 40/166* (2020.01); *G06F 40/284* (2020.01); *G06N 3/045* (2023.01); *G06N 3/08* (2013.01)

(58) Field of Classification Search
CPC ...... G06F 40/30; G06F 40/284; G06F 40/166; G06N 3/045; G06N 3/08
See application file for complete search history.

(56) References Cited

U.S. PATENT DOCUMENTS

| | | | |
|---|---|---|---|
| 10,853,580 B1* | 12/2020 | Amrite | G06N 3/08 |
| 11,093,707 B2* | 8/2021 | Tan | G06V 30/1988 |
| 11,508,360 B2* | 11/2022 | Peng | G06F 40/284 |
| 11,526,667 B2* | 12/2022 | Kantor | G06F 40/284 |
| 11,545,145 B2* | 1/2023 | Fancellu | G06N 3/044 |
| 2019/0287012 A1* | 9/2019 | Celikyilmaz | G06N 3/08 |
| 2020/0372395 A1* | 11/2020 | Mahmud | G06F 3/01 |
| 2021/0295172 A1* | 9/2021 | Sultan | G06N 3/047 |

(Continued)

OTHER PUBLICATIONS

Yuan, Xingdi, Tong Wang, Caglar Gulcehre, Alessandro Sordoni, Philip Bachman, Sandeep Subramanian, Saizheng Zhang, and Adam Trischler, "Machine Comprehension by Text-to-Text Neural Question Generation", Aug. 2017, Proceedings of the 2nd Workshop on Representation Learning for NLP, pp. 15-25. (Year: 2017).*

(Continued)

*Primary Examiner* — Daniel C Washburn
*Assistant Examiner* — James Boggs
(74) *Attorney, Agent, or Firm* — Maginot, Moore & Beck LLP

(57) ABSTRACT

A system and method are disclosed that enable rapid and cost-effective human-in-the-loop synthesis of domain-specific textual training data for a deep learning model. The data augmentation process incorporates a sentence generator, a sentence classifier, and weak-supervision by a domain expert that is 'in the loop.' Generally, both the sentence generator and the sentence classifier are implemented as machine learning models. The sentence generator generates new sentences based on manually labeled sentences and the sentence classifier generates labels for the newly generated sentences. The new sentences are corrected or verified by a domain expert and then used to retrain one or both of the sentence generator and the sentence classifier.

17 Claims, 4 Drawing Sheets

(56) References Cited

U.S. PATENT DOCUMENTS

| | | | | |
|---|---|---|---|---|
| 2021/0319363 A1* | 10/2021 | Gillberg | .................. | G06N 7/01 |
| 2022/0138438 A1* | 5/2022 | Saito | .................... | G06F 40/284 |
| | | | | 704/9 |
| 2022/0198157 A1* | 6/2022 | Li | ........................... | G06N 3/08 |

OTHER PUBLICATIONS

Lewis, M. et al., "BART: Denoising Sequence-to-Sequence Pre-training for Natural Language Generation, Translation, and Comprehension," Proceedings of the 58th Annual Meeting of the Association for Computational Linguistics, 2020, 7871-7880 (10 pages).

Pasunuru, R. et al., "Multi-Reward Reinforced Summarization with Saliency and Entailment," 2018, arXiv:1804.06451v2, https://arxiv.org/pdf/1804.06451.pdf (9 pages).

Rennie, S. J. et al., "Self-critical Sequence Training for Image Captioning," CVPR, Open Access, Computer Vision Foundation, 2017, 7008-7024 (17 pages).

Williams, R. J., "Simple Statistical Gradient-Following Algorithms for Connectionist Reinforcement Learning," Machine Learning, 1992, vol. 8, 229-256 (28 pages).

\* cited by examiner

AUGMENTING TEXTUAL DATA FOR SENTENCE CLASSIFICATION USING WEAKLY-SUPERVISED MULTI-REWARD REINFORCEMENT LEARNING

FIELD

The system and method disclosed in this document relates to sentence classification and, more particularly, to augmenting textual training data for sentence classification.

BACKGROUND

Unless otherwise indicated herein, the materials described in this section are not admitted to be the prior art by inclusion in this section.

Information extraction (IE) is the process or task of acquiring knowledge by extracting and organizing structured information from unstructured text. Information extraction enables efficient and effective utilization of the information from the previously unstructured text by downstream applications, such as a question answering application. In some information extraction tasks, a single sentence is the most appropriate unit of information for conveying a specific type of knowledge. For example, a sentence "The engine of this car is very noisy." describes a certain problem with a car. In this example, the entire sentence is the ideal unit for describing the problem with the car because sub-sentence phrases (e.g., "the engine" or "very noisy") can only partially convey the problem. Thus, classification of a meaning of the whole sentence can be seen as an information extraction task that can be used to form a structured knowledge base of sentences having a target meaning or classification (e.g., car problem).

Sentence classification is widely studied in the field of natural language processing (NLP). As with other natural language processing tasks, the state-of-the-art for sentence classification generally employs deep learning models. Deep learning models have been shown to achieve high performance in some benchmark datasets, as compared to prior models such as rules-based algorithms or traditional feature-rich machine learning models. The benchmark datasets generally comprise a set of sentences annotated with sentence-level labels, and some domain-specific benchmark datasets have been created with domain-specific labels for the specific domains. However, because these existing domain-specific benchmark datasets do not necessarily correspond to the domain of interest, deep learning models trained on these datasets are not directly applicable to other particular domain-specific tasks of interest. Therefore, for many domain-specific tasks, a new domain-specific dataset must be generated in order to train a deep learning based sentence classification model for the task.

Thus, the challenge of domain-specific tasks requiring sentence classification is the same as with any supervised deep learning model. It relies on a large amount of manually labeled training data for supervision. A small amount of training data is insufficient because the models are likely to over-fit to the small amount of training data and not generalize well. However, creating a sufficiently large amount of human-curated training data is difficult because, in practice, human-annotation of sentences by domain experts is often quite expensive. Therefore, it would be advantageous to provide a technique for more easily and cost-effectively creating sufficiently large domain-specific datasets for sentence classification models.

SUMMARY

A method for generating labeled textual training data is disclosed. The method comprises receiving, with a processor, a first unit of text data. The method further comprises generating, with the processor, a second unit of text data based on the first unit of text data using a first machine learning model. The method further comprises determining, with the processor, a label describing a feature of the second unit of text data using a second machine learning model. The method further comprises outputting, with an output device, the second unit of text data and the label to a user. The method further comprises receiving, via a user interface, (i) one of a correction to the second unit of text data and a verification of the second unit of text data, and (ii) one of a correction of the label and a verification of the label. The method further comprises retraining, with the processor, the second machine learning model using (i) one of the corrected second unit of text data and the verified second unit of text data, and (ii) one of the corrected label and the verified label.

A system for generating labeled textual training data is disclosed. The system comprises an output device. The system further comprises a user interface. The system further comprises a memory configured to store a plurality of units of text data, each respective unit of text data in the plurality of units of text data having a respective label describing a feature of the respective unit of text data. The system further comprises a processor operably connected to the output device, the user interface, and the memory. The processor is configured to read a first unit of text data from the plurality of units of text data stored on the memory. The processor is further configured to generate a second unit of text data based on the first unit of text data using a first machine learning model. The processor is further configured to determine a label describing the feature of the second unit of text data using a second machine learning model. The processor is further configured to operate the output device to output the second unit of text data and the label to a user. The processor is further configured to operate the user interface to receive (i) one of a correction to the second unit of text data and a verification of the second unit of text data, and (ii) one of a correction of the label and a verification of the label. The processor is further configured to retrain the second machine learning model using (i) one of the corrected second unit of text data and the verified second unit of text data, and (ii) one of the corrected label and the verified label.

A non-transitory computer-readable medium for generating labeled textual training data is disclosed. The computer-readable medium stores program instructions that, when executed by a processor, cause the processor to receive a first unit of text data. The computer-readable medium stores program instructions that, when executed by a processor, further cause the processor to generate a second unit of text data based on the first unit of text data using a first machine learning model. The computer-readable medium stores program instructions that, when executed by a processor, further cause the processor to determine a label describing the feature of the second unit of text data using a second machine learning model. The computer-readable medium stores program instructions that, when executed by a processor, further cause the processor to operate an output device to output the second unit of text data and the label to a user. The computer-readable medium stores program instructions that, when executed by a processor, further cause the processor to operate a user interface to receive (i)

one of a correction to the second unit of text data and a verification of the second unit of text data, and (ii) one of a correction of the label and a verification of the label. The computer-readable medium stores program instructions that, when executed by a processor, further cause the processor to retrain the second machine learning model using (i) one of the corrected second unit of text data and the verified second unit of text data, and (ii) one of the corrected label and the verified label.

BRIEF DESCRIPTION OF THE DRAWINGS

The foregoing aspects and other features of the system and method are explained in the following description, taken in connection with the accompanying drawings.

DETAILED DESCRIPTION

Figure 1:
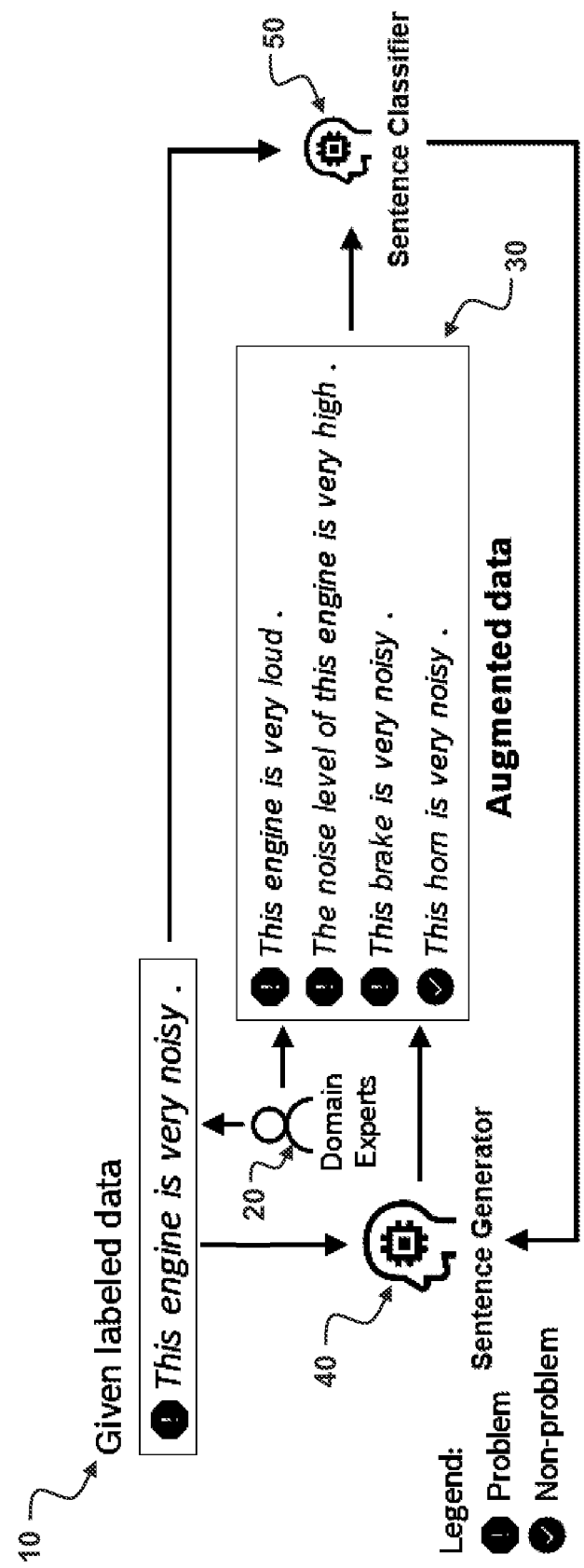
FIG. 1 illustrates a system and method for synthesis of domain-specific training data for a deep learning model.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview of a System and Method for Data Augmentation

FIG. 1 illustrates a system and method that enable rapid and cost-effective human-in-the-loop synthesis of domain-specific training data for a deep learning model. The system and method are described herein with respect to generating domain-specific training data for a domain-specific sentence classification model. Particularly, the exemplary domain-specific sentence classification model described herein is one configured to classify whole sentences as either (1) describing a car problem or (2) not describing a car problem. This sentence classification model may, for example, be a key component in an intelligent automotive aftermarket assistance service that helps users to identify sentences describing specific problems and solutions for car repairs effectively and efficiently.

However, it should be appreciated that the system and method for data augmentation described herein is applicable to synthesizing labeled text data in any domain, as well for synthesizing labeled text data that is not domain-specific Likewise, it should also be appreciated that the system and method for data augmentation described herein can be applied to synthesis labeled text data for any deep learning model, and not only sentence classification models. Finally, it should be appreciated that, although the system and method is illustrated as a system for augmenting English-language text data, it is language-independent in principle and is applicable to any natural language.

With reference to FIG. 1, a data augmentation process begins with a small set of training data 10 that has been manually labeled by domain experts 20. The small set of training data 10 is then used to synthesize a large amount of additional training data 30 using a human-in-the-loop learning-to-augment framework. In the example, the small set of training data 10 comprise car-related natural language sentences that have been manually labeled by the domain experts 20 with corresponding classification labels that indicate whether the sentences describe 1) a problem or (2) a non-problem (e.g., "This engine is very noisy" with the label "problem"). However, in further embodiments, the small set of training data 10 may be provided with additional semantic labels beyond a simple binary classification of the whole sentence.

The data augmentation process has three core features: a sentence generator 40, a sentence classifier 50, and weak-supervision by a domain expert 20 that is 'in the loop.' Generally, both the sentence generator 40 and the sentence classifier 50 are implemented as machine learning models. As used herein, the term "machine learning model" refers to a system or set of program instructions and/or data configured to implement an algorithm, process, or mathematical model (e.g., a neural network) that predicts or otherwise provides a desired output based on a given input. It will be appreciated that, in general, many or most parameters of a machine learning model are not explicitly programmed and the machine learning model is not, in the traditional sense, explicitly designed to follow particular rules in order to provide the desired output for a given input. Instead, a machine learning model is provided with a corpus of training data from which it identifies or "learns" patterns and statistical relationships in the data, which are generalized to make predictions or otherwise provide outputs with respect to new data inputs. The result of the training process is embodied in a plurality of learned parameters, kernel weights, and/or filter values that are used in the various components of the machine learning model to perform various operations or functions.

The sentence generator 40 generates new sentences 30 based on the manually labeled sentences 10 (e.g., "This engine is very loud.", "The noise level of this engine is very high.", "This brake is very noisy.", and "This horn is very noisy."). The sentence generator 40 is initially trained using the small set of sentences 10 using reinforcement learning utilizing a variety of reward functions that weakly supervise the generation of new sentences 30 such that they will provide useful supervision to the further training of the sentence classifier 50, rather than redundant supervision. In this way, the reward functions maximize the utility of the human-in-the-loop (i.e., the domain expert(s) 20) and minimize wasted human labelling effort.

The sentence classifier 50 generates labels for the newly generated sentences 30. Particularly, each of the generated new sentences 30 is passed through the sentence classifier 50 to generate proposed classification labels or other proposed semantic labels. The sentence classifier 50 is also initially trained using the small set of manually labeled sentences 10, using a supervised learning process. Since the sentence classifier 50 is trained on a small set of examples, the sentence classifier 50 generally performs poorly and does not generalize well in the early iterations of the data augmentation process.

The new sentences 30 with the proposed labels are displayed to or otherwise provided for review by a domain expert 20 who interacts with the system to verify the new sentences 30 and correct any errors. Particularly, the domain expert 20 may correct the proposed labels for the new sentences 30 or correct grammatical or similar issues in the text of the new sentences 30. Using the verified new sentences 30, one or both of the sentence generator 40 and the sentence classifier 50 are retrained. In this way, the performance of the data augmentation continuously improves, and less and less time is required for the domain expert 20 to verify each newly generated sentence 30.

The goal of the data augmentation process is to make the learning process for the sentence classifier 50 efficient with a minimal amount of supervision by domain experts. In particular, the data augmentation process learns different regularities for data augmentation in an iterative human-in-the-loop training process that is much more cost-effective than traditional collection and manual labeling of training data. Below, a variety of advantages of the data augmentation process are discussed by clarifying the major differences from four related fields of study: (1) data augmentation, (2) paraphrase generation, (3) textual adversarial attack, and (4) active learning.

Data augmentation (DA) is a family of techniques for expanding existing labeled data into a larger amount of synthesized labeled data. The data augmentation process described herein can be viewed as an advanced data augmentation method. For image data, simple techniques such as rotating and flipping have been proven effective because such operations can ensure class labels (semantic concepts) of the altered data. However, such simple techniques are not applicable to text because it is discrete data and even a small change (e.g., modifying one word) can alter the meaning of a sentence completely, as illustrated by the fourth generated sentence in FIG. 1 (i.e., "This horn is very noisy."). Many existing data augmentation techniques for text rely on heuristics, e.g., synonym substitution and back-translation. These approaches require the availability of external resources such as synonym dictionaries and high-performing machine translation models. However, such resources are often unavailable in specific domains. Thus, traditional data augmentation techniques based on the resources are not scalable to a domain of interest. In contrast, the data augmentation process described herein learns how to augment data directly from the supervision of domain experts. Thus, the data augmentation process described herein has two major advantages, as compared to the traditional data augmentation techniques. First, it removes the need of external resources. Second, it is able to improve the performance of data augmentation along with the domain of interest by exploring different linguistic and knowledge-level regularities through the learning process.

Paraphrase generation is the task of generating output text (e.g., a sentence) which is semantically identical to input text (e.g., a sentence) but contains variations in lexicon, syntax, or both. The data augmentation process described herein is similar to paraphrase generation in terms of variations in sentence modification. Particularly, the data augmentation process described herein is also able to change an input sentence not just at the word level but also at the phrase or sentence level, as illustrated by the second generated sentence in FIG. 1 (i.e., "The noise level of this engine is very high."). However, from a task perspective, the data augmentation process described herein has a different goal from that of paraphrase generation. Paraphrase generation is aimed to rephrase a given text in different ways such that the semantics of generated text remain unchanged, much like the first generated sentence in FIG. 1 (i.e., "This engine is very loud."). In contrast, the data augmentation process described herein can change the meaning of the input sentence significantly to explore different and meaningful supervision, as illustrated by the third and fourth generated sentences in FIG. 1 (i.e., "This brake is very noisy." and "This horn is very noisy."). Moreover, there is further difference from a methodological perspective. Recent work on paraphrase generation also leverages neural models, particularly neural encoder-decoder architectures. In contrast, the data augmentation process described herein extends the traditional encoder-decoder architectures in a significant manner, because it also takes feedback from a sentence classification model as additional input. This feedback serves as an additional signal to optimize the generator component for ideal data augmentation, thereby improving the generalizability of the sentence classification model.

Textual adversarial attacks are used to evaluate the robustness of deep learning models by fooling them with small perturbations on input examples. This has a different spirit in the sense that its main emphasis is on fooling the models by minimally modified examples preserving the original labels of input examples in order to reveal the brittleness of the models. In contrast, the data augmentation process described herein does not have such adversarial intention. Instead, it generates examples in order to enhance the generalizability of the models. For the goal of enhancing generalizability, the data augmentation process described herein does not restrict itself to generating examples preserving the original labels of input examples. Rather, the framework can deliberately generate examples that alter the labels completely to have different kinds of supervision, as illustrated by the fourth generated sentence in FIG. 1 (i.e., "This horn is very loud." which is labeled as a non-problem). From a methodological point of view, the data augmentation process described herein may look similar to black-box models for textual adversarial attack, because it is agnostic to details of a target sentence classification model and only employs the model's input and output. However, the data augmentation process described herein is different from the traditional black-box models for textual adversarial attack in that the generator component is optimized to generate not only uncertain but also diverse and representative sentences, which are useful to improve model generalization.

Finally, active learning (AL) refers a learning process in which human-in-the-loop training is used to support efficient learning. However, the data augmentation process described herein differs from traditional active learning in how the humans' supervision is leveraged in the data labeling. In the case of sentence classification, a traditional active learning process would first train a sentence classification model on an initial set of labeled sentences (seed examples), sample a small set of unlabeled sentences from a large pool of unlabeled data, and get the sentences labeled by domain experts (humans). The newly labeled sentences are added to the initial training data and the model is retrained on the newly expanded training data. This process would be repeated to increase the amount of training data incrementally. In contrast, the data augmentation process described herein has at least one clear difference from traditional active learning. Particularly, it generates new sentences and proposes their labels automatically using the model trained on the existing (labeled) sentences, instead of sampling from unlabeled data. This synthesized data may contain errors (e.g., ungrammatical word orders or incorrect labels) and require corrections by domain experts especially in the initial stage, but the quality of the synthesized data is improved in the course of learning. Because of the new data generation and label proposal, the data augmentation process described herein makes the whole learning process efficient. Unlike active learning, the data augmentation process described herein can, in principle, expand training data iteratively from seed examples without resorting to any additional data (e.g., a large pool of unlabeled data). However, the data augmentation process described herein is flexible in that it can also accept additional labeled sentences during the learning process. In that sense, the data augmentation process described herein is orthogonal to active learning and can be used to enhance the active learning performance.

Sentence Generation Model

The end goal of the data augmentation process described herein is to improve the generalization power of the sentence classifier 50 without the expense of manually labeling a very large set of domain-specific training sentences. Thus, at the heart of the process is the sentence generator 40, which has the ability to synthesize new high-quality sentences from an original sentence using only weak supervision. It should be appreciated that, although the sentence generator 40 is primarily described as generating sentences, the sentence generator 40 may be configured to generate any other unit of text data, such as a phrase or a paragraph. Accordingly, references herein to "sentences" should be understood to also include alternative units of text data that may or may not, strictly speaking, comprise sentences.

In this context, "high-quality" new sentences (or other text data) are synthesized sentences that will provide useful supervision to the further training the sentence classifier 50 and that will improve the generalizing capability of the sentence classifier 50. The sentence generator 40 is, in particular, configured to generate new sentences that are uncertain, diverse, and representative. Each of the qualities of uncertainty, diversity, and representativeness are advantageous for providing useful supervision and improved generalizability of the sentence classifier 50.

As used herein with respect to generating new sentences with the sentence generator 40, "uncertainty" refers to the confidence of the sentence classifier 50 when outputting a proposed classification label for the new sentence. A new sentence that is "uncertain" is one that is close to the decision boundaries of the sentence classifier 50 and for which the initially proposed classification label will have a low confidence value. Correction or verification by the domain expert 20 of new sentences having higher uncertainty will provide more useful supervision to the further training of the sentence classifier 50. Conversely, if the sentence classifier 50 already has a high confidence in the correct classification label of a new sentence, then verification by the domain expert 20 does not provide useful supervision.

As used herein with respect to generating new sentences with the sentence generator 40, "diversity" refers to how different, in form or meaning, the new sentence is compared to the original input sentence (e.g., the manually labeled sentence). A new sentence that is "diverse" is one that is very different from original input sentence. Correction or verification by the domain expert 20 of new sentences having higher diversity will provide more useful supervision to the further training of the sentence classifier 50. Conversely, if a new sentence is very similar to the original input sentence, then verification by the domain expert 20 does not provide useful supervision.

As used herein with respect to generating new sentences with the sentence generator 40, "representativeness" refers to the extent to which a new sentence describes a frequent or common input to the sentence classifier 50 (e.g., a common and realistic car problem) or, conversely, the extent to which the new sentence describes an outlier or rare input (e.g., an unrealistic or nonsensical car problem). Correction or verification by the domain expert 20 of new sentences describing realistic phenomena (e.g., "The engine needs an oil change.") will provide more useful supervision to the further training of the sentence classifier 50. Conversely, if a new sentence describes an unrealistic phenomenon (e.g., "The headlights need an oil change."), then verification or correction by the domain expert 20 does not provide useful supervision.

Each of these sought-after qualities uncertainty, diversity, and representativeness is advantageous in producing useful supervision, but each quality also has its own weakness that is complemented by one or both of the other qualities. For instance, uncertainty will generally prefer outliers (i.e., sentences describing a rare phenomenon), but this is generally mitigated by representativeness. Similarly, representativeness will generally prefer similar sentence and end up with reduced coverage, but this is generally mitigated by diversity. Therefore, rewarding these qualities together is crucial to synthesizing a balanced and high-quality set of new sentences for further training of the sentence classifier 50.

Figure 2:
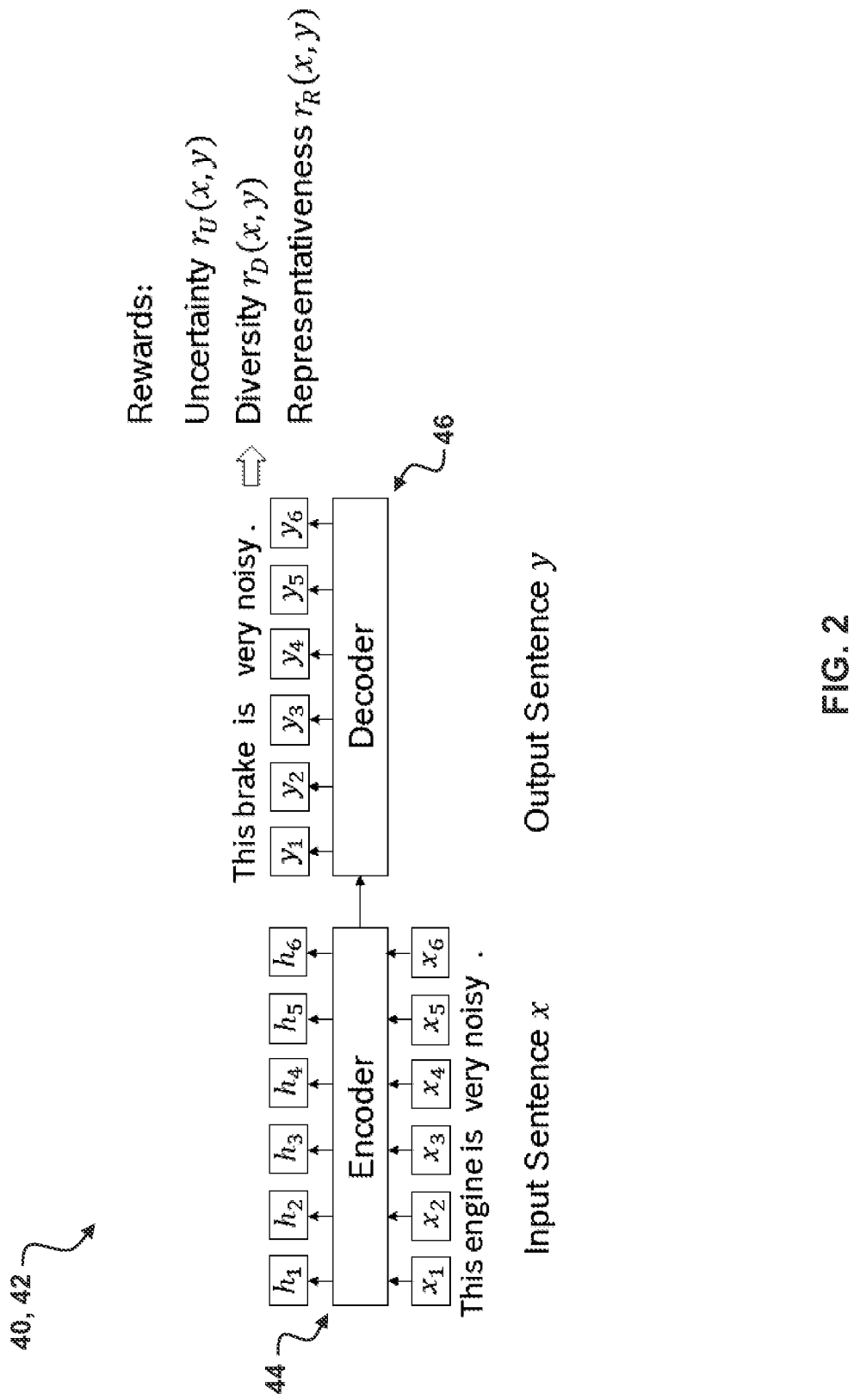
FIG. 2 shows an exemplary embodiment of a sentence generator for generating high-quality new sentences that are uncertain, diverse, and representative.

FIG. 2 shows an exemplary embodiment of the sentence generator 40, which is configured to generate high-quality new sentences that are uncertain, diverse, and representative. In the illustrated embodiment, the sentence generator 40 takes the form of an encoder-decoder model 42 having an encoder 44 and a decoder 46. The encoder-decoder model 42 formalizes the sentence generation as a sequence-to-sequence problem. Particularly, the encoder-decoder model 42 is configured to map an input sentence x to an output sentence y, where x is a sequence of tokens or similar symbol representations (i.e., individual words, characters, punctuation, etc.) $x=x_1, x_2, \ldots, x_m$ of variable length m and, likewise, where y is a sequence of tokens or similar symbol representations $y=y_1, y_2, \ldots, y_n$ of variable length n. As used herein, a "token" refers to representation of an individual word, sub-word, character, or punctuation from text data. Thus, a "tokenization" of text data refers to a conversion of the text data into corresponding sequence of tokens.

The encoder 44 receives the input sentence x and is configured to encode the input sentence x to a sequence of hidden states $h=h_1, h_2, \ldots, h_m$. Given the sequence of hidden states h, the decoder 46 is configured to output a conditional probability distribution of the possible output sentences y. In other words, the decoder 46 generates possible output sentences y, with the probability:

$$\pi(y|x) \prod_{j=1}^{n} \pi(y_j | y_{<j}, x).$$

In at least some embodiments, the sentence generator 40 is Transformer-based neural network encoder-decoder model 42, in which the encoder 44 and the decoder 46 are both stacks of residual attention layers. In one embodiment, the encoder-decoder model 42 employs a pre-trainable Transformer-based encoder-decoder such as BART (Lewis et al., "*BART: Denoising Sequence-to-Sequence Pre-training for Natural Language Generation, Translation, and*

Comprehension," 2020), which is pre-trained on in-domain data such that it captures domain specific regularities. However, it will be appreciated that, in some embodiments, a recurrent neural network (RNN) based encoder-decoder model or any other sequence-to-sequence model may be similarly used.

As noted above, the decoder 46 outputs a conditional probability distribution of the possible output sentences y, given a particular input sequence x. The final output of the decoder 46 is selected based on the conditional probability distribution of the possible output sentences y using an inference algorithm, such as a searching algorithm. For example, in at least one embodiment, beam search is used to identify a predetermined number k of the most probably output sentences y for a particular sequence x (e.g., k=4 possible output sentences, as shown in the example of FIG. 1). In at least one embodiment, the decoder 46 outputs probability distributions on a token-by-token basis (e.g., word-by-word). Let us denote the beam width in beam search as B≥k. In this case, for the first token in the output sequence y, the search algorithm selects the B most likely outputs for the first token. Next, for the second token, the search algorithm then selects the B most likely outputs for the second token, conditioned on the selected possible outputs for the first token. This process repeats for all n tokens in the output sequence y, until k most likely full output sequences y (e.g., complete sentences) are identified. Once a set of k output sequences are identified, they can be fed to the sentence classifier 50 to determine proposed labels and then provided to the domain expert 20 for verification or correction, as discussed above.

As noted above, in at least some embodiments, the sentence generator 40 is trained using reinforcement learning based, at least initially, only on a small set of training data D (e.g., the small set of manually labeled sentences 10). The training data D consists of the manually created sentence-label pairs $\{(x^{(i)}, z^{(i)})\}_{i=1}^{|D|}$, where $x^{(i)}$ is an input sentence and $z^{(i)}$ is a corresponding classification label from a set of pre-defined labels Z (e.g., "car problem" or "not a car problem"). However, it should be appreciated that, although the input sentences $x^{(i)}$ are paired with classification labels $z^{(i)}$, they are not paired with exemplary output sentences y for training the sentence generator 40. Accordingly, this reinforcement learning process used to train the sentence generator 40 does not provide complete word-level supervision. Instead, the reinforcement learning process provides weak sequence-level feedback on generated output sentences.

In at least some embodiments, the sentence generator 40 is trained using a policy-based reinforcement learning algorithm in which a policy $p_\theta$ is learned that is parameterized with model parameters θ. In one embodiment, the sentences generator 40 is trained using the REINFORCE algorithm (Williams, "*Simple Statistical Gradient-Following Algorithms for Connectionist Reinforcement Learning,*" 1992). The policy $p_\theta$ is learned in such as manner as to reinforce the generation of output sequences that satisfy the sequence-level metrics of uncertainty, diversity, and representativeness.

The reinforcement learning process formalizes each metric as a respective reward function r( ) that is computed based on the generated sentence y with its original sentence x. The reinforcement learning process minimizes the negative expected reward as a loss function:

$$L(\theta) = -E_{y^s \sim p_\theta}[r(x, y^s)],$$

where $y^s$ is the sequence of words sampled based on x under the policy $p_\theta$.

The reinforcement learning process approximates the expected gradient with a single sample $y^s \sim p_\theta$ according to the equation:

$$\nabla_\theta L(\theta) \approx -(r(x, y^s) - b)\nabla_\theta \log p(y^s|x)$$

where b is a baseline estimator function. In at least one embodiment, the baseline estimator function is defined as $b=r(x, y^a)$, where $r(x, y^a)$ is the reward obtained from the best output $y^a$, given x, using the current model according to the inference algorithm (e.g., $y^a$ is the most probable output according to the beam search) at a test time.

In some embodiments, the reinforcement learning process utilizes multi-reward optimization approach or, in other words, multiple distinct reward functions $r(x, y^s)$. As described above, it is important that an output sentence y exhibits all of uncertainty, diversity, and representativeness at the same time. To this end, in at least some embodiments, the reinforcement learning process utilizes three reward functions $r_U(x, y)$, $r_D(x, y)$, and $r_R(x, y)$ for uncertainty, diversity, and representativeness, respectively. In particular, generating uncertain, diverse, or representative sentences can each be considered a different and distinct task, and a single model sharing the same parameters θ is optimized with different reward functions:

$$\nabla_\theta L_U(\theta) \approx -(r_U(x, y^s) - r_U(x, y^a))\nabla_\theta \log p(y^s|x),$$

$$\nabla_\theta L_D(\theta) \approx -(r_D(x, y^s) - r_D(x, y^a))\nabla_\theta \log p(y^s|x),$$

$$\nabla_\theta L_R(\theta) \approx -(r_R(x, y^s) - r_R(x, y^a))\nabla_\theta \log p(y^s|x).$$

The uncertainty reward function $r_U(x, y)$ is designed to evaluate a confidence of the sentence classifier 50 when outputting a proposed classification label for a newly generated sentence y. Particularly, let S denote a probabilistic sentence classification model of the sentence classifier 50. The probabilistic sentence classification model S was trained on the (initially small) set of training data D consisting of the manually created sentence-label pairs $\{(x^{(i)}, z^{(i)})\}_{i=1}^{|D|}$. After training, the probabilistic sentence classification model S predicts a classification label z∈Z with a probability $P_S(z|y)$.

The uncertainty reward function $r_U$ can be evaluated according to the equation:

$$r_U(x, y) = H(y) = -\Sigma_{z \in Z} P_S(z|y) \log P_S(z|y),$$

where H (y) is the well-known entropy used as an uncertainty measurement widely used in prior studies on active learning. It should be appreciated that, the uncertainty reward function $r_U$ rewards respective output sentences y generated by the sentence generator 40 for which an entropy of the sentence classifier 50 is relatively higher in assigning respective classification labels z.

The diversity reward function $r_D(x, y)$ is designed to evaluate a difference between a newly generated sentence y and a respective input sentence x. In at least one embodiment, the diversity reward function is determined according to the equation:

$$r_D(x, y) = \text{StrDiff}(x, y)$$

where StrDiff( ) is a distance algorithm such as Hamming distance or Levenshtein edit distance. In at least one embodiment, the distance algorithm determines the difference on a token-level (word-level), but character-level distance algorithms or any other distance algorithms can also be utilized. Thus, the diversity reward function $r_D$ rewards respective output sentences y generated by the sentence generator 40 that are relatively more different from the respective input sentences x.

Finally, the representativeness reward function $r_R(x, y)$ is designed to evaluate the extent to which a new sentence describes a frequent or common meaning or, conversely, the extent to which the new sentence describes an outlier or rare meaning. In one embodiment, the representativeness reward function leverages a neural language model LM. It will be appreciated by those of ordinary skill in the art that a language model is a statistical model that assigns probabilities to words and sentences. In general, a language model assigns higher probabilities to sentences that include real words and that are syntactically correct. In at least one embodiment, the language model LM is trained using a large corpus of in-domain text data. In the case of the "car problems" domain discussed herein for illustrative purposes, the in-domain text data might include, for example, vehicle maintenance, repair, or troubleshooting manuals and other vehicle related text documents. In this way, the language model LM will assign higher probabilities to realistic or common sentences in the respective domain of interest.

In at least one embodiment, the representativeness reward function is computed based on the perplexity of the language model LM with respect to the newly generated sentence y according to the equation:

$$r_R(x, y) = -\text{Perplexity}_{LM}(y).$$

Thus, the diversity reward function $r_D$ rewards respective output sentences y generated by the sentence generator 40 that have a relatively lower perplexity when provided to the language model LM. It will be appreciated by those of ordinary skill in the art that perplexity is a metric typically used for evaluating the intrinsic performance of a language model LM and has a low value when the language model LM assigns a high probability to an input and, conversely, has high value when the language model LM assigns a low probability to an input. Thus, if the negative perplexity is high (i.e., the original perplexity is low), then the newly generated sentence y is representative because the language model LM is good at predicting the sentence. The specific formulation of the perplexity function $\text{Perplexity}_{LM}(y)$ may take a variety of forms that generally relate to the probability $P_{LM}(y)$ that the LM assigns to the newly generated sentence y. In one exemplary embodiment, the perplexity function is defined as $\text{Perplexity}_{LM}(y) = -\log(P_{LM}(y))$ or similar. In another exemplary embodiment, the perplexity function is defined as $\text{Perplexity}_{LM}(y) = \sqrt[n]{P_{LM}(y)}$ or similar.

Sentence Classification Model

As discussed above, the end goal of the data augmentation process described herein is to synthesize a large set of new high-quality domain-specific training sentences that can be used to further train the sentence classifier 50. By training the sentence classifier 50 using the larger set of synthesized training sentences, the generalization power of the sentence classifier 50 can be greatly improved. However, the particular implementation of the sentence classifier 50 is largely unimportant to the data augmentation process itself and, accordingly, the sentence classifier 50 can be implemented using a wide variety of probabilistic model architectures, in particular using a wide variety of machine learning models. In many embodiments, the sentence classifier 50 is implemented using a deep learning model (e.g., convolutional neural networks, recurrent neural networks, Transformer-based neural networks, or the like).

As discussed above, the sentence classifier 50 implements a probabilistic sentence classification model S. The probabilistic sentence classification model S is trained on the (initially small) set of training data D consisting of the manually created sentence-label pairs $\{(x^{(i)}, z^{(i)})\}_{i=1}^{|D|}$. After training, the probabilistic sentence classification model S predicts a most likely classification label $\hat{z} \in Z$ for a newly generated sentence y according to the equation:

$$\hat{z} = \text{argmax}_{z \in Z} S(z|y),$$

where $S(z|y)$ denotes the probability of the newly generated sentence y being classified into $z \in Z$ by S. In other words, the inference model of the sentence classifier 50 simply selects the most likely classification label $\hat{z} \in Z$ as the output.

Data Augmentation System

Figure 3:
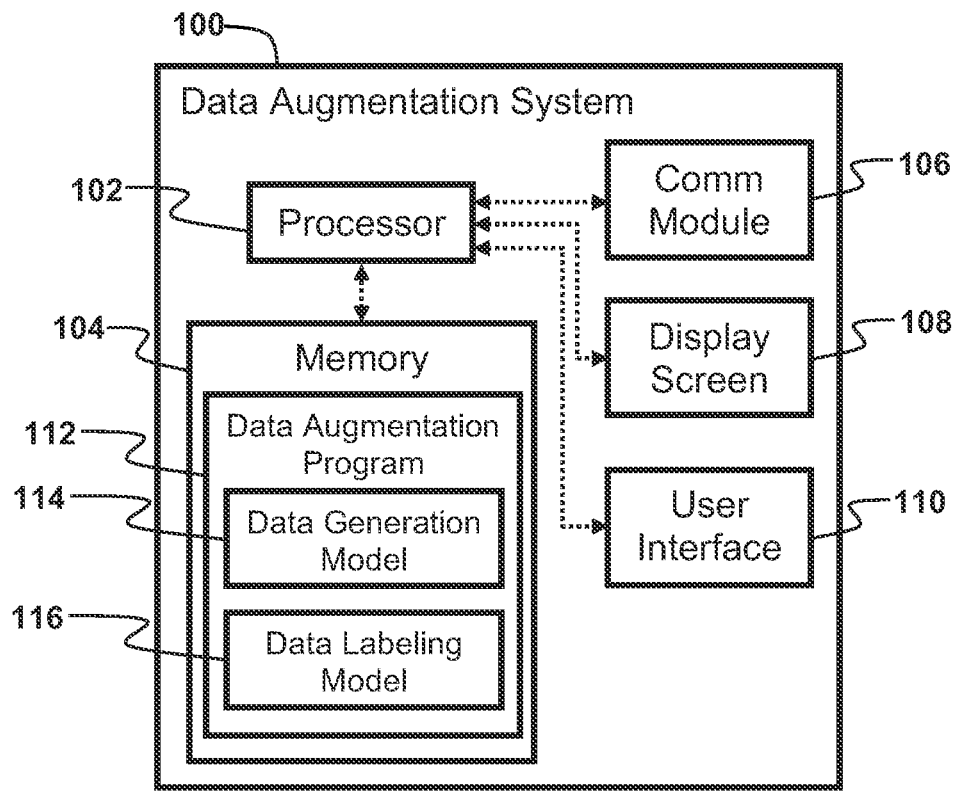
FIG. 3 shows a block diagram of an exemplary embodiment of a data augmentation system for synthesizing new labeled text data.

FIG. 3 shows a block diagram of an exemplary embodiment of a data augmentation system 100. The data augmentation system 100 advantageously utilizes the methods described above to enable rapid and cost-effective human-in-the-loop synthesis of domain-specific training data for a deep learning model. Particularly, in at least one embodiment, the system 100 is configured to synthesize a large number of domain-specific sentences having domain-specific classification labels based on a small number of manually labeled sentences. This synthesized data is used to train a robust sentence classification model which may, for example, enable further downstream processing of the sentences for some application. The downstream application may, for example, comprise an intelligent automotive aftermarket assistance service that helps users to identify sentences describing specific problems and solutions for car repairs effectively and efficiently.

In the illustrated exemplary embodiment, the data augmentation system 100 comprises at least one processor 102, at least one memory 104, a communication module 106, a display screen 108, and a user interface 110. However, it will be appreciated that the components of the data augmentation system 100 shown and described are merely exemplary and that the data augmentation system 100 may comprise any alternative configuration. Particularly, the data augmentation system 100 may comprise any computing device such as a desktop computer, a laptop, a smart phone, a tablet, or other personal electronic device. Thus, the data augmentation system 100 may comprise any hardware components conventionally included in such computing devices.

The memory 104 is configured to store data and program instructions that, when executed by the at least one processor 102, enable the data augmentation system 100 to perform various operations described herein. The memory 104 may be of any type of device capable of storing information accessible by the at least one processor 102, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the at least one processor 102 may include a central processing unit, graphics processing units, multiple processing units, dedicated circuitry for achieving functionality, programmable logic, or other processing systems. Additionally, it will be appreciated that, although the data augmentation system 100 is illustrated as single system, the data augmentation system 100 may comprise several distinct systems that work in concert to achieve the functionality described herein.

The communication module 106 may comprise one or more transceivers, modems, processors, memories, oscillators, antennas, or other hardware conventionally included in a communications module to enable communications with various other devices. In at least some embodiments, the communication module 106 includes a Wi-Fi® module configured to enable communication with a Wi-Fi® network and/or Wi-Fi® router (not shown). In further embodiments, the communications modules 46 may further include a Bluetooth® module, an Ethernet adapter and communications devices configured to communicate with wireless telephony networks.

The display screen 108 may comprise any of various known types of displays, such as LCD or OLED screens. In some embodiments, the display screen 108 may comprise a touch screen configured to receive touch inputs from a user. The user interface 110 may suitably include a variety of devices configured to enable local operation of the data augmentation system 100 by a user, such as a mouse, trackpad, or other pointing device, a keyboard or other keypad, speakers, and a microphone, as will be recognized by those of ordinary skill in the art. Alternatively, in some embodiments, a user may operate the data augmentation system 100 remotely from another computing device which is in communication therewith via the communication module 106 and has an analogous user interface.

The program instructions stored on the memory 104 include a data augmentation program 112, which includes a text data generation model 114 and a text data labeling model 116. Particularly, the processor 102 executes the text data generation model 114 of the data augmentation program 112 to generate generates new text data based on the small set of manually labeled text data. Likewise, the processor 102 executes the text data labeling model 116 of the data augmentation program 112 to generate proposed labels for the newly generated text data. In the sentence classification context, the text data generation model 114 and the text data labeling model 116 implement, for example, the sentence generator 40 and the sentence classifier 50, respectively.

Method of Operating the Data Augmentation System

Figure 4:
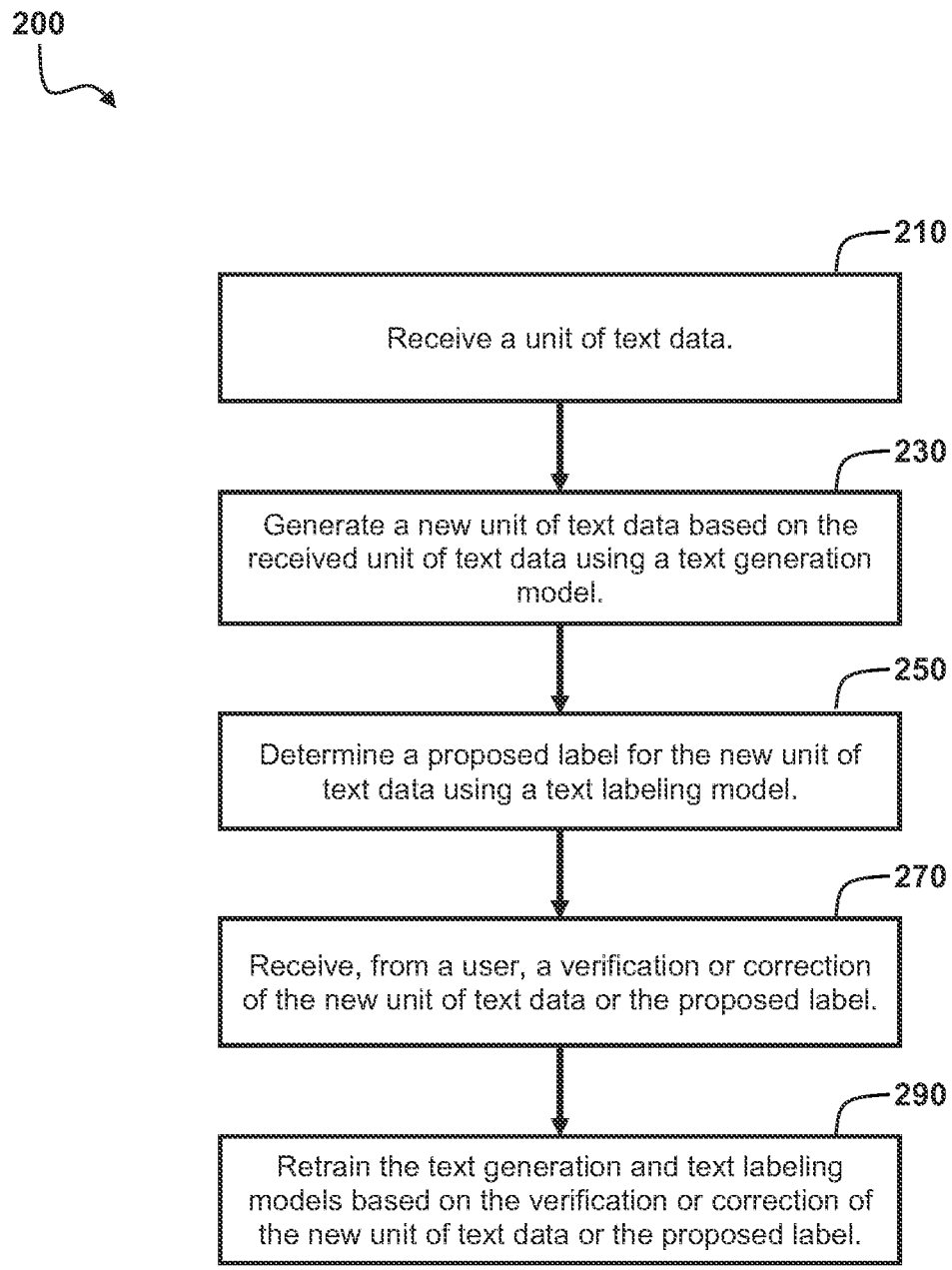
FIG. 4 shows a flow diagram for a method for operating the data augmentation system to synthesize new labeled text data.

FIG. 4 shows a flow diagram for a method 200 for operating the data augmentation system. In the description of these method, statements that some task, calculation, or function is performed refers to a processor (e.g., the processor 102 of the data augmentation system 100) executing programmed instructions (e.g., the data augmentation program 112, the text data generation model 114, or the text data labeling model 116) stored in non-transitory computer readable storage media (e.g., the memory 104 of the data augmentation system 100) operatively connected to the processor to manipulate data or to operate one or more components of the data augmentation system 100 to perform the task or function. Additionally, the steps of the methods may be performed in any feasible chronological order, regardless of the order shown in the figures or the order in which the steps are described.

The method 200 begins with receiving a unit of text data (block 210). Particularly, the processor 102 receives text data, which may be associated with a corresponding label describing a feature of the text data. The text data is, in particular, an individual unit of text data x and may, for example, comprise a sentence, but may similarly comprise any other unit of text data, such as a phrase or a paragraph. In at least one embodiment, the processor 102 reads the unit of text data x from the memory 104, which stores training data D consisting of the manually created sentence-label pairs $\{(x^{(i)}, z^{(i)})\}_{i=1}^{|D|}$ where $x^{(i)}$ is an input sentence and $z^{(i)}$ is a corresponding classification label from a set of predefined labels Z (e.g., "car problem" or "not a car problem").

In at least one embodiment, the plurality of units of text data $x^{(i)}$ relate to a specific domain of information or knowledge (e.g., car problems), as discussed above. In at least one embodiment, the corresponding label $z^{(i)}$ for each unit of text data $x^{(i)}$ is a classification label identifying a classification of the unit of text data $x^{(i)}$ (e.g., whether the sentence describes a car problem or does not describe a car problem), but may also identify a wide variety of semantic concepts and attributes of the corresponding unit of text data. In some embodiments, each unit of text data $x^{(i)}$ may have more than one label $z^{(i)}$.

The method 200 continues with generating a new unit of text data based on the received unit of text data using a text generation model (block 230). Particularly, the processor 102 is configured to execute program instructions of the text data generation model 114 to generate a new unit of text data y based on the received unit of text data x. In some embodiments, the processor 102 generates a plurality of new units of text data y based on each received unit of text data x. As noted above, in the sentence classification context, the text data generation model 114, for example, implements the sentence generator 40 or, more specifically, the encoder-decoder model 42. However, it should be appreciated that the text data generation model 114 may implement different variations and types of machine learning models.

In some embodiments, the processor 102 converts (or "tokenizes") the received unit of text data x into an input sequence of tokens x corresponding to the text and then encodes input sequence of tokens x using an encoder of the text data generation model 114 (e.g., the encoder 44 of the encoder-decoder model 42). Next, the processor 102 determines a probability distribution for an output sequence of tokens y using a decoder of the text data generation model 114 (e.g., the decoder 46 of the encoder-decoder model 42). Finally, the processor 102 determines the new unit of text data y using an inference model of the text data generation model 114.

In at least some embodiments, the inference model of the text data generation model 114 is a searching algorithm, such as beam search, that determines the "best" or most likely output sequences based on the probability distribution for an output sequence of tokens y. Accordingly, in the case that one new unit of text data y is to be determined, the processor 102 determines the new unit of text data y as the most likely output sequence of tokens based on the probability distribution for the output sequence of tokens, using beam search. In the case that a plurality of new units of text data y are to be determined, the processor 102 determines the plurality of new units of text data y as the k most likely output sequence of tokens based on the probability distribution for the output sequence of tokens, using beam search.

As discussed in greater detail above with respect to the encoder-decoder model 42 of FIG. 2, the text data generation model 114 is initially trained using a reinforcement learning process based on the plurality of units of text data $x^{(i)}$ of the training data D stored on the memory 104. In particular, the processor 102 optimizes the parameters of the text data generation model 114 using a multi-reward optimization that reinforces a plurality of reward functions $r_U(x, y)$, $r_D(x, y)$, and $r_R(x, y)$.

The method 200 continues with determining a proposed label for the new unit of text data using a text labeling model (block 250). Particularly, the processor 102 is configured to execute program instructions of the text data labeling model 116 to determine a proposed label $\hat{z}$ from the set of pre-defined labels Z based on the new unit of text data y. In the case that a plurality of new units of text data y were generated, the processor 102 determines a respective proposed label $\hat{z}$ for each new unit of text data y in the plurality of new units of text data y. As noted above, in the sentence classification context, the text data labeling model 116 implements, for example, the sentence classifier 50, which may comprise a wide variety of deep learning models. Likewise, in the sentence classification context, label $\hat{z}$ is a classification label (e.g., "car problem" or "not a car problem").

As discussed in greater detail above with respect to the sentence classifier 50, the text data labeling model 116 is initially trained on the (initially small) set of training data D consisting of the manually created sentence-label pairs $\{(x^{(i)}, z^{(i)})\}_{i=1}^{|D|}$ stored on the memory 104.

The method 200 continues with receiving, from a user, a verification or correction of the new unit of text data or the proposed label (block 270). Particularly, once each pair consisting of a new unit of text data y and a proposed label $\hat{z}$ is generated, the processor 102 operates an output device to output the new unit of text data y and a proposed label $\hat{z}$ to user, in particular a domain expert 20. In at least one embodiment, the processor 102 operates the display screen 108 to display a graphical user interface that includes the new unit of text data y and a proposed label $\hat{z}$.

The processor 102 receives inputs via the user interface 110 that define at least one of (i) a corrected new unit of text data y' including a correction to the new unit of text data y and (ii) a corrected label $\hat{z}'$ that is a correction of the proposed label $\hat{z}$. Alternatively, the processor 102 receives inputs that indicate a verification of the new unit of text data y and a proposed label $\hat{z}$, without any corrections. To this end, the domain expert 20 interacts with the data augmentation system 100 via the display screen 108 and the user interface 110 to verify the accuracy of the new unit of text data y and a proposed label $\hat{z}$ and to provide corrections to the new unit of text data y or a proposed label $\hat{z}$, if necessary. Such corrections may comprise edits to the text data to correct grammatical, spelling, or other syntactical errors in the new unit of text data y. Likewise, the corrections may comprise a change to the proposed label $\hat{z}$ to a different label from the set of pre-defined labels Z.

The method 200 continues with retraining the text generation and text labeling models based on the verification or correction of the new unit of text data or the proposed label (block 290). Particularly, once the new unit of text data y and the proposed label $\hat{z}$ have been corrected or verified by the domain expert 20, the processor 102 stores the corrected/verified new unit of text data y' and the corrected/verified label $\hat{z}'$ in the memory 104 with the original training data D. In other words, the newly generated and verified/corrected sentence-label pair is added to the set of training data D.

With the addition of new training examples to the training data D, the text data generation model 114 and the text data labeling model 116 can be retrained to provide incremental performance improvements. Particularly, the processor 102 retrains the text data generation model 114 using the reinforcement learning process discussed above, using the updated set of training data D, which includes the corrected/verified new unit of text data y'. Likewise, the processor 102 retrains the text data labeling model 116 as discussed above, using the updated set of training data D, which includes the corrected/verified new unit of text data y' and the corrected/verified label $\hat{z}'$ as a pair.

In some embodiments, in addition to the weakly supervised reinforcement learning, the text data generation model 114 can be further trained using pairs of input units of text data x and new units of text data y that have been verified or corrected by the domain expert 20. In this way, as more and more new units of text data y are generated and verified, the text data generation model 114 can be further trained using pair-wise training examples in a more conventional supervised training process.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for generating labeled textual training data, the method comprising:
   receiving, with a processor, a first unit of text data;
   generating, with the processor, a second unit of text data based on the first unit of text data using a first machine learning model;
   determining, with the processor, a label describing a feature of the second unit of text data using a second machine learning model;
   outputting, with an output device, the second unit of text data and the label to a user;

receiving, via a user interface, one of a correction to the second unit of text data and a verification of the second unit of text data; and retraining, with the processor, the second machine learning model using one of the corrected second unit of text data and the verified second unit of text data, wherein, prior to generating the second unit of text data, the first machine learning model is trained based on a plurality of units of text data using a reinforcement learning process that includes optimizing parameters of the first machine learning model using a multi-reward optimization that reinforces a plurality of reward functions, the plurality of reward functions including a first reward function that, given a respective input sequence of tokens to the first machine learning model, rewards respective output sequences of tokens generated by the first machine learning model for which at least one of (i) an uncertainty and (ii) an entropy of the second machine learning model is relatively higher in determining respective labels describing the feature of the respective output sequences of tokens.

2. The method of claim 1 further comprising:
retraining, with the processor, the first machine learning model using the one of the corrected second unit of text data and the verified second unit of text data.

3. The method of claim 1, wherein the first machine learning model is a sequence-to-sequence model.

4. The method of claim 3, the generating the second unit of text data further comprising:
encoding, with the processor, an input sequence of tokens using an encoder of the first machine learning model, the input sequence of tokens being a tokenization of the first unit of text data;
determining, with the processor, a probability distribution for an output sequence of tokens using a decoder of the first machine learning model; and
determining, with the processor, the second unit of text data based on the probability distribution for the output sequence of tokens.

5. The method of claim 4, the generating the second unit of text data further comprising:
determining, with the processor, the second unit of text data as a most likely output sequence of tokens based on the probability distribution for the output sequence of tokens.

6. The method of claim 5, the generating the second unit of text data further comprising:
determining, with the processor, the most likely output sequence of tokens based on the probability distribution for the output sequence of tokens using beam search.

7. The method of claim 4, the generating the second unit of text data further comprising:
generating, with the processor, a plurality of second units of text data, the plurality of second units of text data being determined as a predetermined number of most likely output sequences of tokens based on the probability distribution for the output sequence of tokens.

8. The method of claim 4, wherein at least one of the encoder and the decoder of the first machine learning model has a Transformer-based neural network architecture.

9. The method of claim 1, wherein the plurality of reward functions includes a second reward function that, given a respective input sequence of tokens to the first machine learning model, rewards respective output sequences of tokens generated by the first machine learning model learning model that are relatively more different from the respective input sequence of tokens.

10. The method of claim 1, wherein the plurality of reward functions includes a third reward function that, given a respective input sequence of tokens to the first machine learning model, rewards respective output sequences of tokens generated by the first machine learning model that have a relatively lower perplexity when provided to a language model.

11. The method of claim 1, wherein the second machine learning model is a deep neural network model.

12. The method of claim 1 further comprising:
training, with the processor, prior to determining the label, the second machine learning model based on a plurality of units of text data, each respective unit of text data in the plurality of units of text data having a respective label describing the feature of the respective unit of text data.

13. The method of claim 1, the outputting the second unit of text data and the label further comprising:
displaying, with a display screen, a graphical user interface to a user that includes the second unit of text data and the label.

14. The method of claim 1, wherein the label is a classification of the second unit of text data.

15. The method of claim 1, wherein the first unit of text data comprises at least one natural language sentence and the second unit of text data comprises at least one natural language sentence.

16. A system for generating labeled textual training data, the system comprising:
an output device;
a user interface;
a memory configured to store a plurality of units of text data, each respective unit of text data in the plurality of units of text data having a respective label describing a feature of the respective unit of text data;
a processor operably connected to the output device, the user interface, and the memory, the processor being configured to
read a first unit of text data from the plurality of units of text data stored on the memory;
generate a second unit of text data based on the first unit of text data using a first machine learning model;
determine a label describing the feature of the second unit of text data using a second machine learning model;
operate the output device to output the second unit of text data and the label to a user;
operate the user interface to receive (i) one of a correction to the second unit of text data and a verification of the second unit of text data, and (ii) one of a correction of the label and a verification of the label;
retrain the second machine learning model using (i) one of the corrected second unit of text data and the verified second unit of text data, and (ii) one of the corrected label and the verified label; and
retrain the first machine learning model using the one of the corrected second unit of text data and the verified second unit of text data, wherein, prior to generating the second unit of text data, the first machine learning model is trained based on a plurality of units of text data using a reinforcement learning process that includes optimizing parameters of the first machine learning model using a multi-reward optimization that reinforces a plurality of reward functions, the plurality of reward functions including a first reward function that, given a respective input sequence of tokens to the first machine learning model, rewards respective output sequences of tokens generated by the first machine learning model for which at least one of (i) an uncertainty and (ii) an entropy of the second machine learning model is relatively higher in determining respective labels describing the feature of the respective output sequences of tokens.

17. A non-transitory computer-readable medium for generating labeled textual training data, the non-transitory computer-readable medium storing program instructions that, when executed by a processor, cause the processor to:
- receive a first unit of text data;
- generate a second unit of text data based on the first unit of text data using a first machine learning model;
- determine a label describing a feature of the second unit of text data using a second machine learning model;
- operate an output device to output the second unit of text data and the label to a user;
- operate a user interface to receive (i) one of a correction to the second unit of text data and a verification of the second unit of text data, and (ii) one of a correction of the label and a verification of the label; and
- retrain the second machine learning model using (i) one of the corrected second unit of text data and the verified second unit of text data, and (ii) one of the corrected label and the verified label, wherein, prior to generating the second unit of text data, the first machine learning model is trained based on a plurality of units of text data using a reinforcement learning process that includes optimizing parameters of the first machine learning model using an optimization that reinforces a reward function that, given a respective input sequence of tokens to the first machine learning model, rewards respective output sequences of tokens generated by the first machine learning model for which at least one of (i) an uncertainty and (ii) an entropy of the second machine learning model is relatively higher in determining respective labels describing the feature of the respective output sequences of tokens.

* * * * *